(12) United States Patent
Odena et al.

(10) Patent No.: US 11,790,211 B2
(45) Date of Patent: Oct. 17, 2023

(54) ADJUSTING NEURAL NETWORK RESOURCE USAGE

(71) Applicant: Google LLC, Mountain View, CA (US)

(72) Inventors: Augustus Quadrozzi Odena, San Francisco, CA (US); John Dieterich Lawson, Menlo Park, CA (US)

(73) Assignee: Google LLC, Mountain View, CA (US)

(*) Notice: Subject to any disclaimer, the term of this patent is extended or adjusted under 35 U.S.C. 154(b) by 1539 days.

(21) Appl. No.: 15/884,253

(22) Filed: Jan. 30, 2018

(65) Prior Publication Data

US 2019/0236438 A1    Aug. 1, 2019

(51) Int. Cl.
*G06N 3/045* (2023.01)
*G06N 3/08* (2023.01)
*G06N 3/044* (2023.01)

(52) U.S. Cl.
CPC ............. *G06N 3/045* (2023.01); *G06N 3/044* (2023.01); *G06N 3/08* (2013.01)

(58) Field of Classification Search
CPC .. G06N 3/00; G06N 3/02; G06N 3/04; G06N 3/0445; G06N 3/0454; G06N 3/06; G06N 3/08; G06N 5/00; G06N 5/02; G06N 7/00; G06N 7/005; G06N 20/00; G06N 20/10; G06N 20/20
See application file for complete search history.

(56) References Cited

PUBLICATIONS

Liu et al. "Dynamic Deep Neural Networks: Optimizing Accuracy-Efficiency Trade-offs by Selective Execution", 2017 https://arxiv.org/pdf/1701.00299v2.pdf (Year: 2017).*
Almahairi et al. "Dynamic Capacity Networks", 2016 https://arxiv.org/pdf/1511.07838.pdf (Year: 2016).*
Odena et al. "Changing Model Behavior At Test-Time Using Reinforcement Learning", 2017 https://arxiv.org/pdf/1702.07780.pdf (Year: 2017).*
Park et al. "Big/little deep neural network for ultra low power inference", Oct. 2015 https://ieeexplore.ieee.org/abstract/document/7331375 (Year: 2015).*

(Continued)

*Primary Examiner* — Kamran Afshar
*Assistant Examiner* — Shoun J Abraham
(74) *Attorney, Agent, or Firm* — Fish & Richardson P.C.

(57) ABSTRACT

Methods, systems, and apparatus, including computer programs encoded on computer storage media, for adjusting neural network resource usage. One of the methods includes receiving a network input for processing by a task neural network, the task neural network comprising a plurality of neural network layers; receiving a usage input specifying a respective weight for each of one or more usage factors, wherein each usage factor impacts how many computational resources are used by the task neural network during the processing of the network input; and processing the network input using the task neural network in accordance with the usage input to generate a network output for the network input, comprising: selecting, based at least on the usage input, a proper subset of the plurality of neural network layers to be active while processing the network input, and processing the network input using only the selected neural network layers.

18 Claims, 4 Drawing Sheets

(56) References Cited

PUBLICATIONS

Chakradhar et al. "A Dynamically Configurable Coprocessor for Convolutional Neural Networks", Jun. 2010 https://dl.acm.org/doi/pdf/10.1145/1815961.1815993 (Year: 2010).*
Lin et al. "Runtime Neural Pruning", 2017 https://proceedings.neurips.cc/paper/2017/file/a51fb975227d6640e4fe47854476d133-Paper.pdf (Year: 2017).*
Andreas et al. "Learning to compose neural networks for question answering," arXiv 1601.01705v4, Jun. 7, 2016, 10 pages.
Bengio et al. "Conditional computation in neural networks for faster models," arXiv 1511.06297v2, Jan. 7, 2016, 12 pages.
Denoyer et al. "Deep sequential neural network," arXiv 1410.0510v1, Oct. 2, 2014, 9 pages.
Eigen et al. "Learning factored representations in a deep mixture of experts," arXiv 1312.4314v3, Mar. 9, 2014, 8 pages.
Fernando et al. "Pathnet: Evolution channels gradient descent in super neural networks," arXiv 1701.08734v1, Jan. 30, 2017, 16 pages.
Figurnov et al. "Spatially adaptive computation time for residual networks," arXiv 1612.02297v2 Jul. 2, 2017, 13 pages.
Graves. "Adaptive computation time for recurrent neural networks," arXiv 1603.08983v6, Feb. 21, 2017, 19 pages.
Shazeer et al. "Outrageously large neural networks: The sparsely-gated mixture-of-experts layer," arXiv 1701.06538v1, Jan. 23, 2017, 19 pages.
Willaims. "Simple statistical gradient-following algorithms for connectionist reinforcement learning," Machine Learning, 8(3-4), 1992, 28 pages.

* cited by examiner

ADJUSTING NEURAL NETWORK RESOURCE USAGE

BACKGROUND

This specification relates to neural network architectures.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes how a system implemented as computer programs on one or more computers in one or more locations can process network inputs using a task neural network while using varying amounts of computational resources.

Particular embodiments of the subject matter described in this specification can be implemented so as to realize one or more of the following advantages.

Unlike conventional systems, the described systems can effectively adapt the amount of computational resources, e.g., system memory, processing power, and processing time, used by a task neural network to account for the amount of resources available for use by the systems, quality requirements for the outputs generated by the task neural network, latency requirements for generating an output, or other factors that impact how many resources should be consumed by processing a given network input.

That is, a conventional neural network uses a fixed amount of computational resources to process each network input after the network has been trained. The described system, on the other hand, can modify how many computational resources are used by the task neural network when processing different inputs because of the architecture of the task neural network and by making use of a controller neural network.

For example, when it is important to generate an output with low latency, e.g., for a hotword detection task for a speech recognition system, the system can decrease the computational complexity of the operations performed by the task neural network to cause the task neural network to generate an output faster.

As another example, when it is important to generate an output with very high quality, e.g., for a user authentication task, the system can increase the computational complexity of the operations performed by the task neural network to cause the task neural network to generate a higher-quality output, even if it requires a longer processing time.

As another example, when output quality is less important, e.g., when the margin of error allowable for outputs is relatively high, the system can decrease the amount of computational resources used in generating the output.

As yet another example, when the amount of computational resources available to the system is limited, e.g., when the task neural network is deployed on a mobile device or other device with limited processing capacity and available memory, the system can effectively limit the amount of resources consumed when generating network outputs.

Thus, the system can effectively modulate the amount of computational resources consumed by the processing of network inputs to more effectively and efficiently manage the computational resources available to the system.

Additionally, because of the architecture of the task neural network and the controller neural network, the networks can be trained jointly once and then deployed in any of various computational environments having different resource usage constraints. Thus, unlike conventional neural networks, there is no need to re-train the neural networks before deploying them in a different computational environment or using them in circumstances with different quality or latency requirements, thereby saving computational resources that would otherwise be necessary for re-training.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
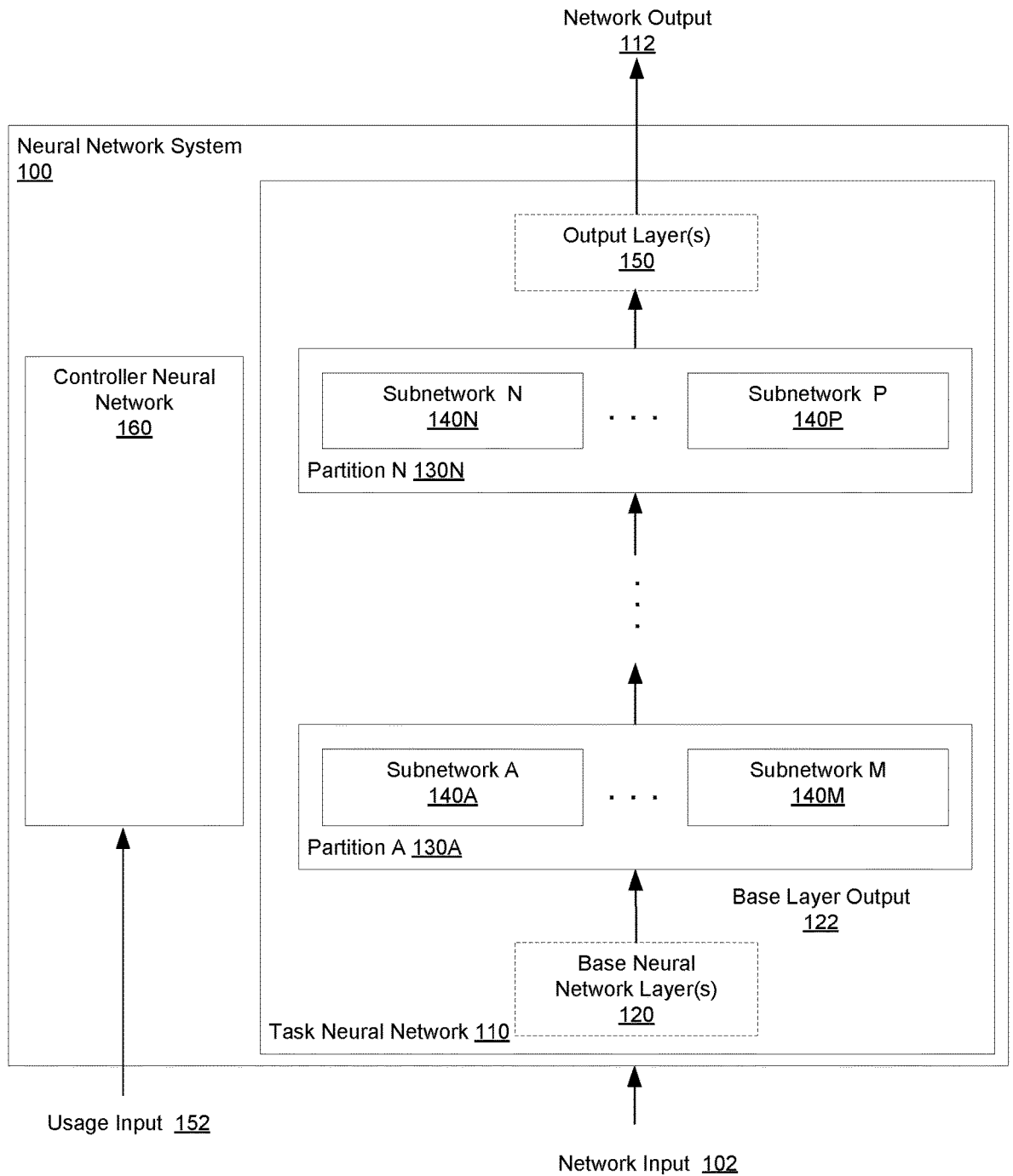
FIG. 1 shows an example neural network system.

This specification describes a system implemented as computer programs on one or more computers in one or more locations that processes a network input using a task neural network that is configured to perform a particular neural network task, i.e., that is configured to generate a particular type of network output from the network input. For each network input, the system can, based on a usage input, adjust how many computational resources, e.g., memory, processing power, and processor cycles, the system uses during the processing of the network input.

The task neural network can be configured to receive any kind of digital data input and to generate any kind of score, classification, or regression output based on the input.

For example, if the inputs to the task neural network are images or features that have been extracted from images, the output generated by the task neural network for a given image may be scores for each of a set of object categories, with each score representing an estimated likelihood that the image contains an image of an object belonging to the category.

As another example, if the inputs to the task neural network are Internet resources (e.g., web pages), documents, or portions of documents or features extracted from Internet resources, documents, or portions of documents, the output generated by the task neural network for a given Internet resource, document, or portion of a document may be a score for each of a set of topics, with each score representing an estimated likelihood that the Internet resource, document, or document portion is about the topic.

As another example, if the inputs to the task neural network are features of an impression context for a particular advertisement, the output generated by the task neural network may be a score that represents an estimated likelihood that the particular advertisement will be clicked on.

As another example, if the inputs to the task neural network are features of a personalized recommendation for a user, e.g., features characterizing the context for the recommendation, e.g., features characterizing previous actions taken by the user, the output generated by the task neural network may be a score for each of a set of content items, with each score representing an estimated likelihood that the user will respond favorably to being recommended the content item.

As another example, if the input to the task neural network is a sequence of text in one language, the output generated by the task neural network may be a score for each of a set of pieces of text in another language, with each score representing an estimated likelihood that the piece of text in the other language is a proper translation of the input text into the other language.

As another example, if the input to the task neural network is a sequence representing a spoken utterance, the output generated by the task neural network may be a score for each of a set of pieces of text, each score representing an estimated likelihood that the piece of text is the correct transcript for the utterance.

As another example, the task neural network can be an action selection neural network used to select actions to be performed by a reinforcement learning agent interacting with an environment, e.g., a mechanical agent interacting with a real-world environment or a simulated agent interacting with a simulated environment. In this example, the input to the task neural network is an observation, i.e., data characterizing the current state of the environment, and the output of the task neural network is an action selection output that can be used to select an action from a set of actions to be performed by the agent, e.g., an output defines a probability distribution over the set of actions or a respective Q value for each action.

FIG. 1 shows an example neural network system 100. The neural network system 100 is an example of a system implemented as computer programs on one or more computers in one or more locations, in which the systems, components, and techniques described below can be implemented.

The neural network system 100 is a system that receives a network input 102 and processes the network input 102 using a task neural network 110 to generate a network output 112 for the network input 102. As described above, the task neural network 110 can be configured to receive any kind of digital data input and to generate any kind of score, classification, or regression output based on the input.

The neural network system 100 also receives a usage input 152 that specifies a respective weight for each usage factor in a set of one or more usage factors. Each of the usage factors is a factor that impacts how many computational resources the task neural network 110 uses while processing the network input 102. The weight for a given usage factor defines how important the usage factor is for the processing of the network input 102.

For example, the set of usage factors can include the quality of the network output generated by the task neural network 110 by processing the network input 102 and the weight for the quality usage factor can define how important it is that the task neural network 110 maximizes the quality of the network output generated for the network input 102 or generates an output that has a quality that exceeds a particular threshold.

As another example, the set of usage factors can include the time, e.g., as measured by wall clock time or in processor cycles, required to process the network input 102 and the weight for the processing time usage factor defines how important it is that the task neural network 110 minimizes the time taken to process the network input 102 or that the task neural network 110 keeps the time taken below a particular threshold.

As another example, the set of usage factors can include the computational complexity of the processing of the network input 102, e.g., measured in terms of number of parameters used in processing the network input 102, and the weight for the complexity usage factor defines how important it is that the task neural network 110 minimizes the complexity or that the task neural network 110 keeps the complexity below a particular threshold while processing the network input 102.

As another example, when the task neural network is being used as an action selection neural network, the set of usage factors can include the risk sensitivity of the reinforcement learning agent, i.e., how tolerant the agent would be to accept the selection of an action that has a less certain but higher expected reward, and the weight for the risk sensitivity usage factor defines how important it is that the task neural network 110 generates an action selection output that has a high level of certainty.

In some implementations and as will be described in more detail below, the system augments the received weights in the usage input 152 with pre-determined weights for one or more additional factors. These factors are generally factors having weights that vary during training but that are fixed after training, i.e., factors that serve to improve the training of the task neural network 110 but that should not affect the performance of the task neural network 110 after the network has been trained.

In some cases, the neural network system 100 receives a new usage input 152 for each network input 102.

For example, a user of the system 100 may be able to submit an input through a user interface provided by the system 100 that defines the usage input for a given network input 102. In some cases, the user interface allows the user to directly specify the weights for the usage factors for a network input or a group of network inputs. In some other cases, the user interface allows the user to characterize the network input or a group of network inputs, e.g., as an input for which quality is very important, as an input for which quick processing and low latency is very important, or as an input for which use of computational resources can be minimized as long as some minimum quality output is generated, and the system 100 translates the user input into the weights that are included in the usage input, e.g., by using a pre-determined mapping between possible characterizations and sets of weights.

In some other implementations, the neural network system 100 receives a single usage input 152 when the task neural network 110 is first deployed on a particular computer. The system 100 then uses the same usage input 152 for each network input that is received while the task neural network is deployed on the computer.

For example, after the task neural network 110 has been trained, the task neural network 110 can be deployed on a mobile device that has limited computational capacity. The system 100 can then receive a usage input that specifies weights for the usage factors that are set in accordance with the limited computational capacity of the mobile device, e.g., weights that emphasize processing inputs with limited computational complexity or while using limited computational resources.

Generally, the neural network system 100 uses the usage input 152 to select a proper subset, i.e., less than all, of the neural network layers in the task neural network 110 to be active during the processing of the network input 102 and then processes the network input 102 using only the selected neural network layers.

More specifically, the task neural network 110 includes multiple subnetworks that are partitioned into multiple partitions 130A-130N. That is, although different partitions can include different numbers of subnetworks, each partition includes multiple subnetworks. For example, partition 130A includes subnetworks 140A-N while partition 130N includes subnetworks 140M-P.

As can be seen in the example of FIG. 1, the components of the task neural network 110, including the partitions, are arranged in a sequence. Optionally, the task neural network 100 can also include additional neural network layers that are not in any of the subnetworks, e.g., one or more base neural network layers 120 before any of the partitions in the sequence, one or more output layers 150 after all of the partitions in the sequence, or both. As can be seen in the example of FIG. 1, the sequence starts with the base neural network layers 120 and ends with the output layers 150. While not shown in FIG. 1, in some cases, the task neural network 110 can include one or more additional neural network layers between two or more of the partitions in the sequence.

Each subnetwork generally includes one or more neural network layers. Within a given partition, each subnetwork is configured to receive the same type of input and generate the same type of output as the other subnetworks in the given partition. That is, each subnetwork is configured to receive an input of the same size, i.e., the same dimensionality, as the other subnetworks and generate an output that is the same size as the outputs generated by the other subnetworks.

However, at least some of the subnetworks within each partition use different amounts of computational resources, e.g., processing power and memory, when processing an input from the other subnetworks in the partition. In particular, at least some of the subnetworks in the partition have a different number of parameters from the other subnetworks in the partition.

For example, the subnetworks in the partition may have different numbers of neural network layers, i.e., some subnetworks may have more network layers than other subnetworks in the partition.

As another example, one or more of the subnetworks in the partition may be configured to operate on only a portion of the input. For example, when the input is a three-dimensional array that includes features for each of multiple spatial locations, e.g., an image or a feature map derived from an image, one or more subnetworks in the partition may be configured to operate on the entire feature map while one or more other subnetworks in the same partition may be configured to first crop the array to retain the features for only a portion of the spatial locations and then operate on the cropped array. As another example, when the input is a sequence that includes a respective input at each of multiple time steps, one or more of the subnetworks may be configured to operate on the whole sequence, while one or more other subnetworks may be configured to operate on the inputs at only a subset of the time steps.

As another example, one or more of the subnetworks may be configured to operate on lower-resolution versions of the input from other subnetworks in the partition. For example, one subnetwork may be configured to operate on the input directly, while another subnetwork may be configured to first down-sample the input to generate a down-sampled input and then operate on the down-sampled input.

In order to select the proper subset of the subnetworks in the task neural network 110 to be active during the processing of the network input 102, the system 100 selects one subnetwork from each of the partitions to be active during the processing of the network input 102 based on the usage input 152. Because the neural network layers within a partition use different amounts of computational resources, the system 100 can effectively adjust the resource usage of the task neural network 110 while processing the network input 102 by selecting different subnetworks from the different partitions.

In particular, the system 100 selects a subnetwork from each partition using a controller neural network 160.

Generally, the controller neural network 160 is a neural network that is configured to generate, for each of the partitions and conditioned on the usage input 152, a probability distribution that includes a respective probability for each of the subnetworks in the partition. The system 100 then selects a layer from each partition using the probability distribution for the partition, i.e., by selecting the subnetwork with the highest probability or sampling from the probability distribution.

More specifically, the controller neural network 160 is a recurrent neural network, e.g., a long short-term (LSTM) neural network, that is configured to perform operations at each of multiple time steps during the processing of the network input. The multiple time steps include a respective time step for each of the partitions. At the time step corresponding to a given partition, the controller neural network 160 is configured to receive a controller input for the time step and to process the controller input to generate the probability distribution that includes a respective probability for each of the subnetworks in the given partition.

The controller input for a time step corresponding to a given partition includes data identifying the subnetwork that was selected from the partition that is immediately before the partition in the sequence. For the first partition in the sequence, the data identifying the subnetwork can be fixed placeholder data.

In some implementations, the controller input at each time step also includes the input that will be provided to the subnetwork corresponding to the time step, i.e., the output generated by the component that immediately precedes the corresponding subnetwork in the sequence.

To condition the controller neural network 160 on the usage input 152, in some cases the controller input for each time step also includes the usage input 152. In some other cases, the controller neural network 160 is conditioned on the usage input 152 in a different manner. For example, the usage input may be included in the controller input only at the first time step, i.e., the first time step is a designated time step at which only the controller input is provided to the controller neural network 160 or the usage input 152 is combined with the other components of the controller input for the first subnetwork in the sequence. The controller neural network 160 can then be trained to incorporate the usage input for future time steps through updating the internal state of the controller neural network 160.

The controller neural network 160 and selecting subnetworks from the partitions is described in more detail below with reference to FIG. 3.

So that the task neural network 110 and the controller neural network 160 can effectively be used to process various network inputs and in accordance with various usage inputs, the system 100 trains the task neural network 110 and the controller neural network 160 jointly on training data to determine trained values of the respective parameters of the two neural networks, i.e., of the controller neural network 160 and the components of the task neural network 110. Training the neural networks will be described in more detail below with reference to FIG. 4.

Figure 2:
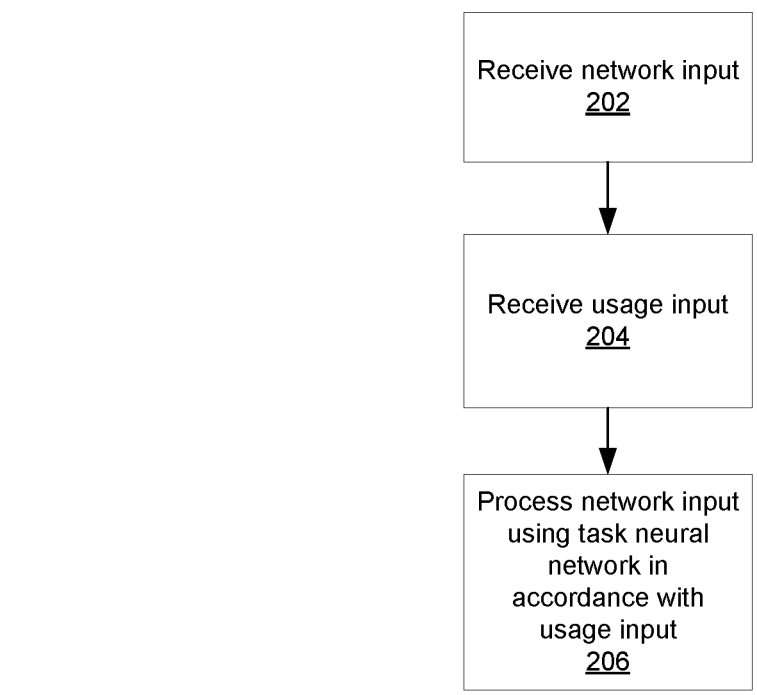
FIG. 2 is a flow diagram of an example process for processing a network input using a task neural network.

FIG. 2 is a flow diagram of an example process 200 for processing a network input using a task neural network. For convenience, the process 200 will be described as being performed by a system of one or more computers located in one or more locations. For example, a neural network system, e.g., the neural network system 100 of FIG. 1, appropriately programmed, can perform the process 200.

The system receives a network input for processing by the task neural network (step 202).

The system receives a usage input (step 204). As described above, the usage input includes a respective weight for each of one or more usage factors. Each of the usage factors is a factor that impacts how many computational resources the task neural network uses while processing the network input and the weight for the usage factor defines how important the usage factor is for the processing of the network input.

The system processes the network input using the task neural network in accordance with the usage input to generate a network output for the network input (step 206). In particular, during the processing of the network input, the system selects a subnetwork from each of the partitions and does not use any of the subnetworks that were not selected in processing the network input. Selecting a network input from a partition is described below with reference to FIG. 3.

Once generated, the system can output the network output or a processed output generated from the network output, e.g., for presentation to a user or to another system for immediate use or for storage.

Figure 3:
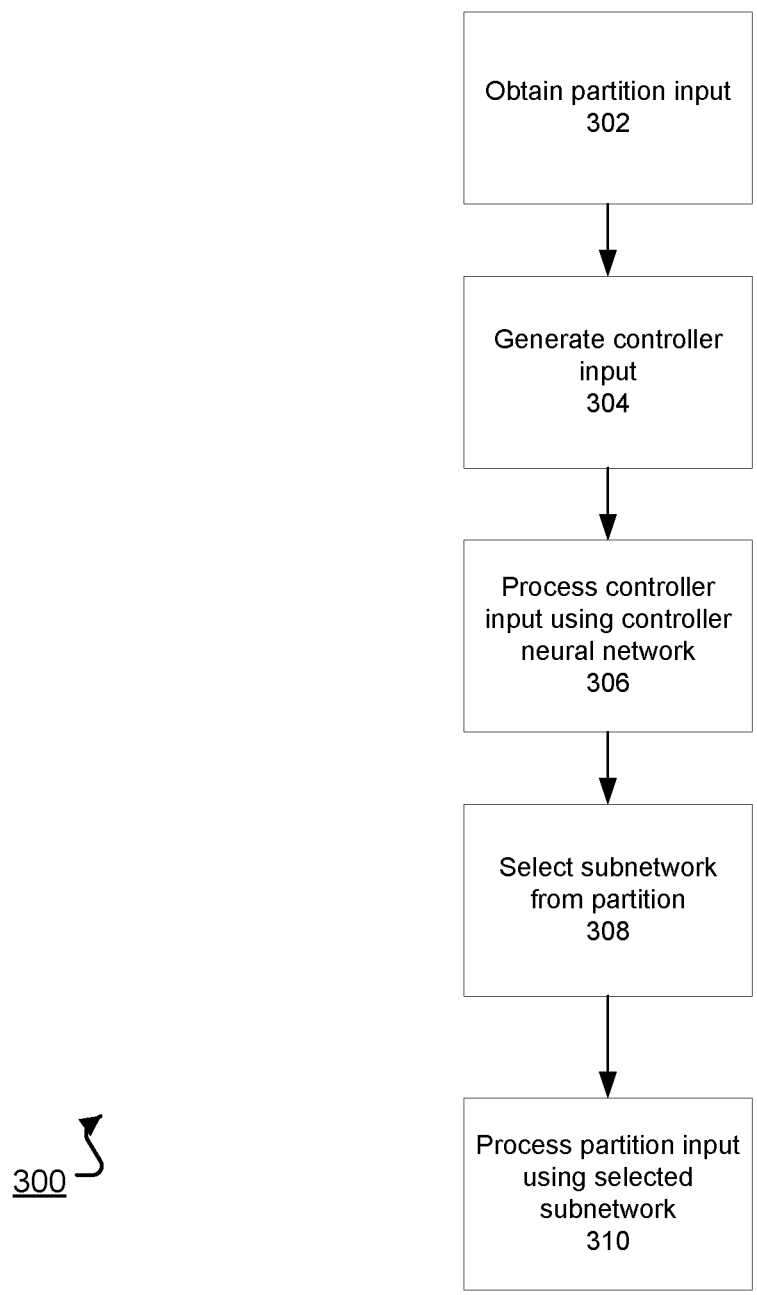
FIG. 3 is a flow diagram of an example process for selecting a subnetwork from a partition during the processing of a network input.

FIG. 3 is a flow diagram of an example process 300 for selecting a subnetwork from a partition during the processing of a network input. For convenience, the process 300 will be described as being performed by a system of one or more computers located in one or more locations. For example, a neural network system, e.g., the neural network system 100 of FIG. 1, appropriately programmed, can perform the process 300.

The system obtains an input to the partition (step 302). If the partition is the first component in the sequence of components in the task neural network, the input to the partition will be the network input. If the partition is not the first component in the sequence, the input to the partition will be the output generated by the preceding component in the sequence generated during the processing of the network input.

The system generates a controller input for the controller neural network using the input to the partition (step 304).

Generally, the controller input includes a preceding partition input identifying the subnetwork that was selected from the preceding partition in the sequence of components. If the current partition is the first partition in the sequence, the preceding partition value can be set to a predetermined value.

In some cases, the controller input also includes the input to the partition.

In some cases, the controller input also includes the usage input. In some other cases, as described above, the controller neural network is conditioned on the usage input in some other manner.

The system processes the controller input using the controller neural network to generate a probability distribution that includes a respective probability for each subnetwork in the partition (step 306). Since the controller neural network is a recurrent neural network, the controller neural network is configured to process the controller input in accordance with the internal state of the controller neural network to generate the probability distribution and to update the internal state. For the first partition in the sequence, the internal state is a designated initial internal state. For the remaining partitions in the sequence, the internal state is the updated internal state after the processing for the preceding partition in the sequence.

The system selects a subnetwork from the partition using the probability distribution (step 308). In some cases, the system selects the subnetwork with the highest probability. In some other cases, the system samples from the probability distribution to select the subnetwork.

The system processes the input to the partition using the selected subnetwork to generate an output for the partition (step 310) and does not use any of the other subnetworks in the partition in processing the network input.

Because at least some of the subnetworks in the partition use different amounts of computational resources in processing the network input, the system can effectively adjust the computational resource usage of the task neural network by performing the partition selection process 300.

Figure 4:
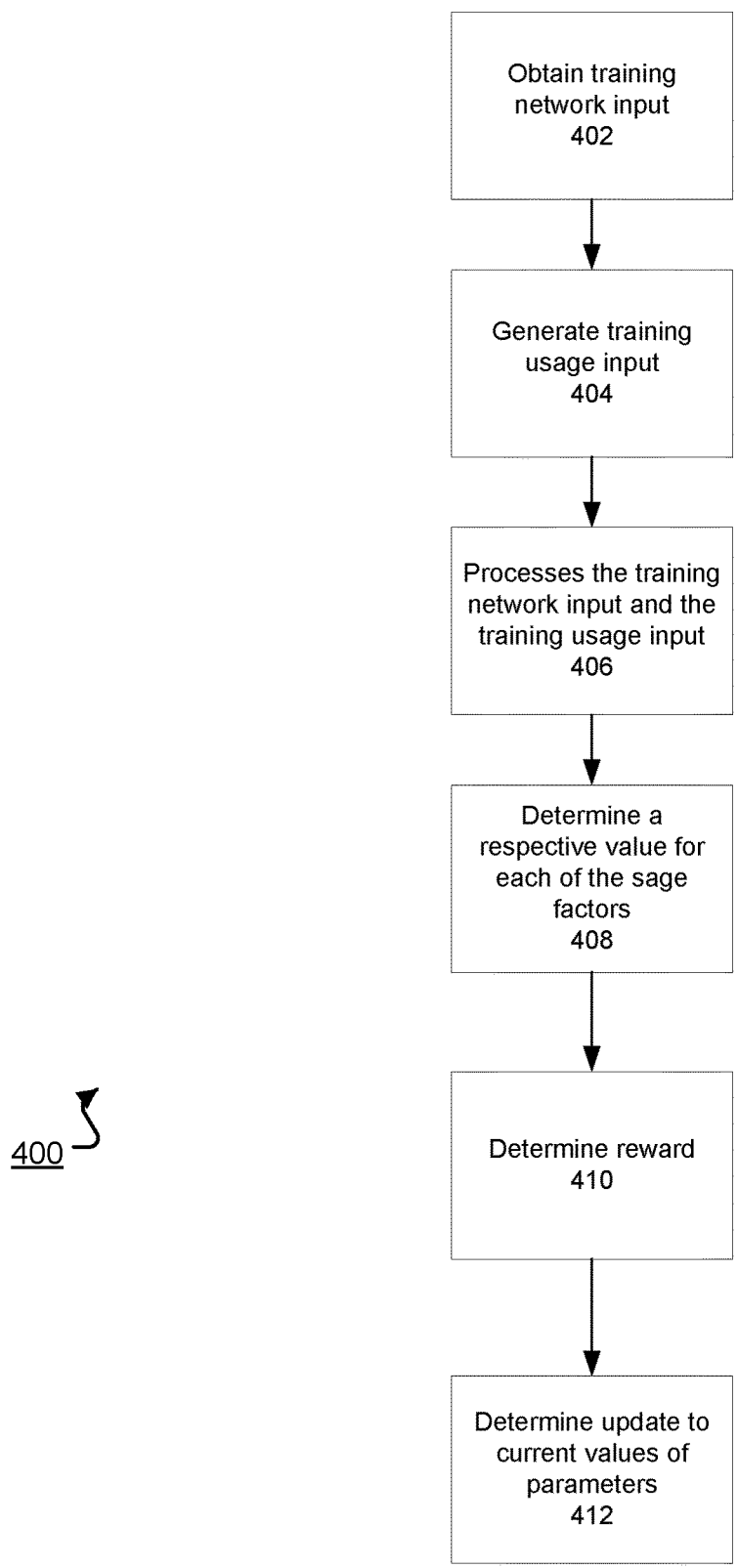
FIG. 4 is a flow diagram of an example process for updating current values of the controller network parameters and the task network parameters.

FIG. 4 is a flow diagram of an example process 400 for updating current values of the controller network parameters and the task network parameters. For convenience, the process 400 will be described as being performed by a system of one or more computers located in one or more locations. For example, a neural network system, e.g., the neural network system 100 of FIG. 1, appropriately programmed, can perform the process 400.

The system repeatedly performs the process 400 for different training network inputs in a set of training data to train the controller neural network and the task neural network, i.e., to determine trained values of the parameters of the controller neural network (the "controller network parameters") from initial values of the controller network parameters and trained values of the parameters of the task neural network (the "task network parameters") from initial values of the task network parameters.

The system obtains a training network input (step 402). For example, the training network input can be one of the training network inputs in a batch of training network inputs selected from the set of training data.

The system generates a training usage input that includes a respective weight for each usage factor in the set of usage factors (step 404).

In particular, the system generates a respective weight for each of the usage factors in the set of usage factors.

For some or all of the usage factors, the system can randomly or pseudo-randomly select a weight for the usage factors from the possible weights for the usage factor. In some cases, each of the usage factors have the same set of possible weights while in other cases some of the usage factors can have different sets of possible weights in order to normalize the contribution of the various usage factors to the reward, which will be described below. For example, the possible weights for one usage factor can be in the range of zero to one, while the possible weights for another factor can be in the range of zero to one tenth.

As described above, in some implementations the set of usage factors can include one or more additional factors that are set to a fixed value, e.g., zero, after training, but whose values can vary during the training to improve the effectiveness of the training process. In these implementations, the system also generates a weight for each additional factor.

For example, the set of additional factors can include an entropy factor that measures, for each partition, how uniform the probabilities assigned to the subnetworks in the partition are. After training, the system can permanently set the weight for the entropy factor to zero. During training, however, the system can either set the weight randomly or anneal the weight from one to zero as the training proceeds in accordance with a fixed annealing schedule.

The system processes the training network input and the training usage input using the task neural network and the controller neural network to generate a training network output for the training network input (step 406). That is, the system selects a subnetwork from each partition using the controller neural network in accordance with the current values of the controller network parameters and processes the network input using the selected subnetworks from each of the partitions in accordance with the current values of the task network parameters as described above with reference to FIGS. 2 and 3.

The system determines a respective value for each of the usage factors as a result of the processing (step 408). The value for each of the usage factors is a measurement of the factor during the processing of the network input.

For example, if the set of usage factors includes the quality usage factor, the value can be a measure of quality of the training network output relative to a known output for the training network output. For example, the measure of quality can be the negative of an error between the training network output and a known output for the training network input, e.g., a cross-entropy error or a mean-square error. As another example, the measure of quality can be the likelihood or the log likelihood assigned to the known output by the training network output.

As another example, if the set of usage factors includes the time usage factor, the value for the time usage factor can be the measure of the time required to process the network input, e.g., as measured by wall clock time or in processor cycles.

As another example, if the set of usage factors includes the computational complexity of the processing of the network input, the value for the computational complexity factor can be the total number of parameters used in processing the network input.

The system determines a reward from the weights in the training usage input and the values of the usage factors (step 410).

In particular, in some cases, the system determines the reward as a weighted sum of the values of the usage factors, with the weight for each usage factor in the weighted sum being the weight for the usage factor in the training usage input.

In some cases, when the set of usage factors does not include a quality usage factor, the system nonetheless accounts for the quality of the generated training output relative to a known output for the training input when generating the reward. For example, the system can add the measure of the quality to the weighted sum to determine the total reward.

The system determines an update to the current values of the controller network parameters and the task network parameters based on the reward using a reinforcement learning technique (step 412). That is, the system trains the neural networks jointly to maximize the expected reward using the reinforcement learning technique, e.g., a policy gradient technique, to determine a respective update to each of the current values of the controller and task network parameters. For example, the policy gradient technique can be any appropriate conventional policy gradient technique, e.g., REINFORCE technique or a Proximal Policy Optimization (PPO) technique.

Once the process 400 has been performed for each of the training network inputs in the batch, the system then applies the updates to the current values to generate updated values of the controller network parameters and the task network parameters.

In some cases, the system also makes further modifications to the values of the controller network parameters, the task network parameters, or both, during the training. For example, in some cases, after the process 400 has been performed for a batch of training examples, the system can further adjust the current values of the controller network parameters based on how uniform the probabilities in the probability distributions were for the network inputs in the batch, i.e., to encourage the controller neural network not to assign high probabilities only to subnetworks that have been trained the most during the training.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
   receiving a network input for processing by a task neural network, the task neural network comprising a plurality of neural network layers;
   receiving a usage input that is different from the network input and that specifies a respective weight for each of one or more usage factors, wherein each usage factor impacts how many computational resources are used by the task neural network during the processing of the network input; and
   processing the network input using the task neural network in accordance with the usage input different from the network input to generate a network output for the network input, comprising:
      selecting, based at least on the usage input different from the network input, a proper subset of the plurality of neural network layers to be active while processing the network input, comprising:
         processing, using a trained controller neural network, a controller input that comprises the usage input different from the network input to generate a respective score for each subnetwork of a plurality of subnetworks of the task neural network in accordance with trained values of controller neural network parameters, each subnetwork comprising one or more neural network layers; and
         selecting a subnetwork from the plurality of subnetworks of the task neural network using the respective scores; and
      processing the network input using only the selected neural network layers.

2. The method of claim 1, wherein the neural network comprises a plurality of components, wherein the plurality of components comprise a plurality of partitions each including a respective plurality of subnetworks, wherein the subnetworks in each partition are each configured to receive a same type of layer input and to generate a same type of layer output as each other subnetwork in the partition, and wherein selecting, based at least on the usage input, a proper subset of the plurality of neural network layers to be active while processing the network input comprises:
   selecting a respective subnetwork from each of the partitions.

3. The method of claim 2, wherein at least one subnetwork in each partition consumes a different amount of computational resources than at least one other subnetwork in the partition.

4. The method of claim 2, wherein the components further comprise at least one of a base neural network layer or an output layer in addition to the plurality of subnetworks.

5. The method of claim 2, wherein the components are arranged in a sequence from a first component in the sequence to a last component in the sequence, and wherein selecting a respective subnetwork from each partition comprises, for each of the partitions:
   processing a controller input for the partition using the controller neural network, wherein the controller input for the partition comprises the usage input different from the network input and a preceding partition input for the partition, and wherein the controller neural network is configured to process the controller input to generate a score distribution comprising a respective score for each layer in the partition, and
   selecting a subnetwork from the partition using the score distribution for the partition,
   wherein, for each partition after a first partition in the sequence, the preceding partition input for the partition identifies a subnetwork that was selected from the preceding partition in the sequence.

6. The method of claim 5, wherein the controller input further comprises a partition input for the partition, and wherein the partition input is:
   for the first partition in the sequence, (i) the network input or (ii) an output generated by a component preceding the first partition in the sequence, and
   for each other partition in the sequence other than the first partition, an output generated by a component preceding the first partition in the sequence.

7. The method of claim 5, wherein the controller neural network has been trained jointly with the task neural network to maximize a reward function using reinforcement learning.

8. A system comprising one or more computers and one or more storage devices storing instructions that when executed by the one or more computers cause the one or more computers to perform operations comprising:
receiving a network input for processing by a task neural network, the task neural network comprising a plurality of neural network layers;
receiving a usage input that is different from the network input and that specifies a respective weight for each of one or more usage factors, wherein each usage factor impacts how many computational resources are used by the task neural network during the processing of the network input; and
processing the network input using the task neural network in accordance with the usage input different from the network input to generate a network output for the network input, comprising:
selecting, based at least on the usage input different from the network input, a proper subset of the plurality of neural network layers to be active while processing the network input, comprising:
processing, using a trained controller neural network, a controller input that comprises the usage input different from the network input to generate a respective score for each subnetwork of a plurality of subnetworks of the task neural network in accordance with trained values of controller neural network parameters, each subnetwork comprising one or more neural network layers; and
selecting a subnetwork from the plurality of subnetworks of the task neural network using the respective scores; and
processing the network input using only the selected neural network layers.

9. The system of claim 8, wherein the neural network comprises a plurality of components, wherein the plurality of components comprise a plurality of partitions each including a respective plurality of subnetworks, wherein the subnetworks in each partition are each configured to receive a same type of layer input and to generate a same type of layer output as each other subnetwork in the partition, and wherein selecting, based at least on the usage input, a proper subset of the plurality of neural network layers to be active while processing the network input comprises:
selecting a respective subnetwork from each of the partitions.

10. The system of claim 9, wherein at least one subnetwork in each partition consumes a different amount of computational resources than at least one other subnetwork in the partition.

11. The system of claim 9, wherein the components further comprise at least one of a base neural network layer or an output layer in addition to the plurality of subnetworks.

12. The system of claim 9, wherein the components are arranged in a sequence from a first component in the sequence to a last component in the sequence, and wherein selecting a respective subnetwork from each partition comprises, for each of the partitions:
processing a controller input for the partition using the controller neural network, wherein the controller input for the partition comprises the usage input different from the network input and a preceding partition input for the partition, and wherein the controller neural network is configured to process the controller input to generate a score distribution comprising a respective score for each layer in the partition, and
selecting a subnetwork from the partition using the score distribution for the partition,
wherein, for each partition after a first partition in the sequence, the preceding partition input for the partition identifies a subnetwork that was selected from the preceding partition in the sequence.

13. The system of claim 12, wherein the controller input further comprises a partition input for the partition, and wherein the partition input is:
for the first partition in the sequence, (i) the network input or (ii) an output generated by a component preceding the first partition in the sequence, and
for each other partition in the sequence other than the first partition, an output generated by a component preceding the first partition in the sequence.

14. The system of claim 12, wherein the controller neural network has been trained jointly with the task neural network to maximize a reward function using reinforcement learning.

15. One or more non-transitory computer-readable storage media storing instructions that when executed by one or more computers cause the one or more computers to perform operations comprising:
receiving a network input for processing by a task neural network, the task neural network comprising a plurality of neural network layers;
receiving a usage input that is different from the network input and that specifies a respective weight for each of one or more usage factors, wherein each usage factor impacts how many computational resources are used by the task neural network during the processing of the network input; and
processing the network input using the task neural network in accordance with the usage input different from the network input to generate a network output for the network input, comprising:
selecting, based at least on the usage input different from the network input, a proper subset of the plurality of neural network layers to be active while processing the network input, comprising:
processing, using a trained controller neural network, a controller input that comprises the usage input different from the network input to generate a respective score for each subnetwork of a plurality of subnetworks of the task neural network in accordance with trained values of controller neural network parameters, each subnetwork comprising one or more neural network layers; and
selecting a subnetwork from the plurality of subnetworks of the task neural network using the respective scores; and
processing the network input using only the selected neural network layers.

16. The computer-readable storage media of claim 15, wherein the neural network comprises a plurality of components, wherein the plurality of components comprise a plurality of partitions each including a respective plurality of subnetworks, wherein the subnetworks in each partition are each configured to receive a same type of layer input and to generate a same type of layer output as each other subnetwork in the partition, and wherein selecting, based at least on the usage input, a proper subset of the plurality of neural network layers to be active while processing the network input comprises:

selecting a respective subnetwork from each of the partitions.

17. The computer-readable storage media of claim 16, wherein at least one subnetwork in each partition consumes a different amount of computational resources than at least one other subnetwork in the partition.

18. The computer-readable storage media of claim 16, wherein the components are arranged in a sequence from a first component in the sequence to a last component in the sequence, and wherein selecting a respective subnetwork from each partition comprises, for each of the partitions:
  processing a controller input for the partition using the controller neural network, wherein the controller input for the partition comprises the usage input different from the network input and a preceding partition input for the partition, and wherein the controller neural network is configured to process the controller input to generate a score distribution comprising a respective score for each layer in the partition, and
  selecting a subnetwork from the partition using the score distribution for the partition,
  wherein, for each partition after a first partition in the sequence, the preceding partition input for the partition identifies a subnetwork that was selected from the preceding partition in the sequence.

* * * * *